United States Patent [19]

Kong et al.

[11] Patent Number: 5,798,424
[45] Date of Patent: Aug. 25, 1998

[54] OLEFIN POLYMERIZATION CATALYST AND PROCESS FOR THE POLYMERIZATION OF OLEFINS USING THE SAME

[75] Inventors: Gap-goung Kong; Youn-Seok Park, both of Taejeon-si, Rep. of Korea

[73] Assignee: Samsung General Chemicals Co., Ltd., Chungnam, Rep. of Korea

[21] Appl. No.: 811,841

[22] Filed: Mar. 5, 1997

[30] Foreign Application Priority Data

Oct. 9, 1996 [KR] Rep. of Korea ............... 1996/44736

[51] Int. Cl.⁶ .......................................... C08F 4/646
[52] U.S. Cl. ................ 526/124.2; 526/127; 526/159; 526/161; 526/348.5; 502/103; 502/111; 502/117; 502/134
[58] Field of Search ................. 502/111, 117, 502/134, 132, 103; 526/124.2, 127, 159, 161; 556/54, 56

[56] References Cited

U.S. PATENT DOCUMENTS 3,737,416  6/1973  Hayashi et al. ............. 526/124.2 X
4,087,402  5/1978  Monte et al. ................. 556/54 X
4,892,914  1/1990  Hefner ........................ 526/124.2 X
5,134,104  7/1992  Sasaki et al. .

FOREIGN PATENT DOCUMENTS 0606125      7/1994   European Pat. Off. .
63-191811    8/1988   Japan .
6-340711    12/1994   Japan .
007208916A   1/1973   Netherlands ............... 526/124.2

OTHER PUBLICATIONS

Linden et al., "Polymerization of α-Olefins and Butadiene and Catalytic Cyclotrimerization of 1-Alkynes by a New Class of Group IV Catalysts. Control of Molecular Weight and polymer Microstructure via Ligand Tuning in Sterically Hindered Chelating Phenoxide Titanium and Zirconium Species." *J. Am. Chem. Soc.*, 1995, 117, pp. 3008–3021.

*Primary Examiner*—Fred Teskin
*Attorney, Agent, or Firm*—Banner & Witcoff, Ltd.

[57] ABSTRACT

A catalyst for olefin (co)polymerization, comprising a solid catalyst component employing chelated transition metal compound supported on inorganic magnesium compound and organoaluminum compound; and a process for olefin (co)polymerization using the catalyst.

8 Claims, No Drawings

OLEFIN POLYMERIZATION CATALYST AND PROCESS FOR THE POLYMERIZATION OF OLEFINS USING THE SAME

FIELD OF INVENTION

The present invention relates to heterogeneous catalyst and process for olefin polymerization using said catalyst, and more particularly to novel olefin polymerization catalysts containing chelated transition metal compound supported on inorganic carrier compounds such as magnesium halide or silica compound.

BACKGROUND OF INVENTION

Whereas metallocene compounds are known to be an excellent catalyst for (co)polymerization of olefin and have improved properties when one or two cyclopentadienyl ligand is replaced by indenyl, fluorenyl ligand, or bridged ligand, still they have some disadvantages such as the synthetic difficulty, modification of existing polymerization process. Recently several inventions have been made employing oxygen or heteroatom bound chelated transition metal compound as homogeneous catalysts for olefin polymerization and attracted hot attention, because these compounds are easier to synthesize than metallocene compounds and are known to show excellent (co)polymerization properties with methylaluminoxane (MAO) cocatalyst. As like metallocene catalysts, "chelate catalysts" (catalysts which chelated transition metal compounds are employed as an active transition metal component) are anticipated to display excellent (co)polymerization ability.

Relatively d or P-character rich orbitals of transition metal compounds are localized toward constrained geometry of chelate ligands to form bonds between transition metal and chelated ligand, and relatively S-character rich orbital would be left toward incoming olefin or α-olefin. And this S-character rich orbital of transition metal would be more electrophilic and also provide space of wider angle toward incoming olefin and result in improved (co)polymerization ability. Also, since oxygen or heteroatom bound chelated transition metal compound is much easier to synthesize than metallocene compound, and as an alternative compound to metallocene compound there have been active investigations of oxygen or heteroatom bound chelated transition metal compound.

Japanese Laid-Open Patent sho 63-191811 disclosed the chelated catalysts for ethylene and propylene polymerization where chlorides of titanium chloride compound are replaced by TBP ligand (6-tert butyl-4-methylphenoxy). With methylaluminoxane (MAO) cocatalyst, it was reported to polymerize ethylene and propylene with excellent activity and have high molecular weight (Mw=3,600,000).

U.S. Pat. No. 5,134,104 reported chelate catalysts employing amine substituted halide titanium compound, {$(C_8H_{17})_2NTiCl_3$} and the results of olefin polymerization with these catalysts. J. Am. Chem. Soc., 117, 3008, introduced catalysts using oxygen bound chelated transition metal compound which localize the coordination sphere of transition metal compounds. Also transition metal compounds chelated with phenoxy derivative ligands were reported in Japanese Laid-Open Patent hei6-340711 and EP 0606125A2, which produce high molecular weight polymer having narrow molecular weight distribution with MAO as cocatalyst. However, most of investigated "chelate catalysts" have never reported examples of copolymerization of α-olefin. Also they have been employed as a homogeneous catalyst with methylaluminoxane (MAO) to polymerize olefin and never been used as a heterogeneous catalyst for olefin polymerization, which can control the morphology of polymer and can be applied to the existing plant without major adjustment of polymerization process.

On the other hand, when low to medium density polyethylene is desired to obtain by the slurry polymerization process with conventional $TiCl_4$ based Ziegler-Natta catalyst, the resulting polymer is liable to dissolve or swell in the reaction solution and it is impossible to avoid the formation of substantial amount of ethylene copolymers soluble in hydrocarbon solvents and consequently the viscosity of the copolymer solution increases to cause various troubles such as reduction in stirring efficiency, blockage of pipes, low efficiency of separating the copolymer from the reaction solvent. Also, compositional distribution of the resulting copolymer polymerized with conventional $TiCl_4$ based Ziegler-Natta catalyst tends to be very wide and high quality copolymers capable of being formed into films having excellent transparency, antiblocking property and heat sealing property are difficult to obtain. Therefore, it has been desired that transition metal compound catalysts having excellent (co)polymerization properties and capable of giving olefin polymers with narrow compositional distribution

SUMMARY OF INVENTION

An objective of the present invention is to provide heterogeneous chelated transition metal catalyst components supported on inorganic magnesium halide compounds, which exhibit excellent slurry polymerization properties and are capable of giving olefin (co)polymers having broad molecular weight distribution and narrow compositional distribution when used in polymerization of homopolymer of ethylene, propylene or in the preparation of medium density ethylene copolymers having density of 0.910 to 0.945 g/cm³ by copolymerization of ethylene and α-olefin.

DETAILED DESCRIPTION OF INVENTION

The olefin polymerization catalysts of the present invention and the process for the polymerization of olefin using said catalysts are illustrated below in detail. The olefin polymerization catalyst of the present invention comprises:

[a] Transition metal catalyst component which is the magnesium supported transition metal compound represented below by Formula (I),

Formula (I)

Wherein, M is group IV transition metal; X is halide; A and B are independently O, S, Se, N, P, or Si that form chelate bond with transition metal M; R is aliphatic or aromatic hydrocarbon to form five membered ring with element A, B and transition metal M;

[b] Organometallic aluminum compound component.

Transition metal catalysts component [a] can be prepared by two method;

First method is that through the reaction of chelate ligand with Grignard reagent, magnesium compound containing chelate ligand (A-1) is prepared and subsequently this magnesium compound containing chelate ligand reacts with transition metal halide to form chelated transition metal compound supported on magnesium halide compound simultaneously, which is described by the Equation (1) below (Method I).

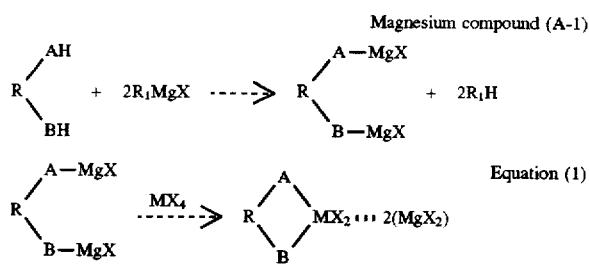

In Equation(1), R, A, B, M and X are the same as described above, and $R_1$ is alkyl or arkl group.

Second method is that after synthesis of chelated transition metal compound (M-1) through the reaction of chelate ligand with transition metal halide compound, this chelated transition metal compound is supported on the magnesium halide support compound through the heterogeneous reaction between solid magnesium halide support compound and liquid phase of chelated transition metal compound, which is described by Equation (2) below (Method II).

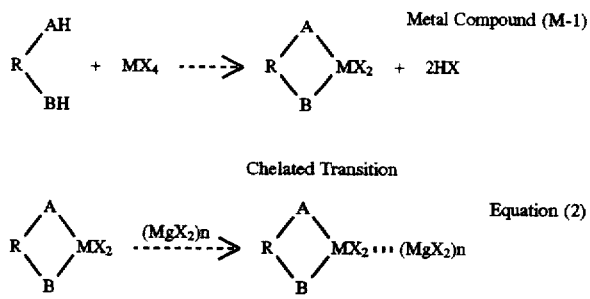

In Equation (2), R, A, B, M, and X are the same as described above.

In the structure of chelate ligand useful for the present invention, it is preferred that R in the Formula (I) forms rigid backbone containing double bond or aromatic group capable of delocalizing π electron with transition metal and in such a geometry that ring components of R, A, B, M are to form five membered ring. Because five membered transition metal compounds bearing double bonds or aromatic backbones are very stable and chelate bonds between A, B and transition metal would not be broken by Lewis acid such as organoaluminum compound which is used as cocatalyst. For example, when 2,2-biphenol is employed as a chelate ligand, the resulting 7-membered transition metal chelate compound can be easily broken by strong Lewis acid such as organoaluminum compound which is used as a cocatalyst in the polymerization process. The elements A and B are preferred to be alkoxy or amine group to form chelated bonds with transition metals and the synthesis of transition metal compounds chelated by hydroxy ligand or amine chelate ligands bearing double bond or aromatic backbone could be easily done. Also, another advantage of employing hydroxy or amine chelate ligand bearing double bond or aromatic backbone is that they are weak base and the reaction between transition metal halide and chelate ligand are not so vigorous and control of morphology of the resulting heterogeneous solid catalyst should be easier.

Useful chelate ligand for the preparation of chelate transition metal compounds includes bidentate ligand such as ethylene glycol, propylene glycol, pentaerythrytol, catechol, tetrabromocatechol, tetrachlorocatechol, 4-tert-butyl catechol, 2,3-dihydroxynaphthalene, 1,8'-dihydroxynaphthalene, 1,10'-dihydroxyphenanthryne, 2,3-dihydroxypyridine, 2,3-dihydroxyquinoxane, 2,2'-hydroxybiphenylether and its derivatives, 1,8-dihydroxyanthraquinone, 2-acetylpyrrole, 2-benzoylpyrrole, 8-hydroxyquinoline, methylacetylacetone, methylacetylacetonate. Of the useful ligands as exemplified above, preferred are catechol, tetrabromocatechol, tetrachlorocatechol, 4-tert-butylcatechol, 2,3-dihydroxynaphthalene, 2,3-dihydroxypyridine, 8-hydroxyquinoline.

In the preparation of transition metal catalyst component (a) by the Method (I) which is described by Equation (1) above, magnesium compound containing chelate ligand (A-1) can be prepared through the reaction of Grignard reagent with chelate ligand under mixed solvents of ether such as diethylether, dibutyl ether, diisoamyl ether, or THF and hydrocarbon such as hexane, heptane, decane, toluene (first step of Equation 1). In the hydrocarbon rich solvent system, precipitation of the magnesium compound occur as a result of reaction of Grignard reagent and terminal hydroxy group or amine group of bidentate chelate ligand. Also, by proper combination of ether solvent and hydrocarbon solvent, liquid phase of magnesium compound containing chelate ligand (A-1) can be obtained. When the precipitation of the magnesium compound containing chelate ligand (A-1) happens abruptly, it is difficult to get particles having an excellent shape and a narrow particle size distribution (morphology). Depending on the ratio of ether and hydrocarbon solvent, the morphology of the resulting solid catalyst was changed and the volume ratio of ether and hydrocarbon (ether/hydrocarbon) is preferred to be 0.5~1.0 to obtain a good particle. Also, it is preferred that the reaction condition is mild to produce the solid having good morphology and reaction temperature does not exceed 10° C. After magnesium compound containing chelate ligand (A-1) is prepared, it is better to treat the magnesium compound with Lewis acid such as organometallic aluminum compound to remove the attached basic ether solvent and the treatment might be better if the reaction is done at temperature higher 70° C. Then through decanting and washing procedure, impurity can be removed to get the pure magnesium compound containing chelate ligand (A-1).

The magnesium compound containing chelate ligand (A-1) can be further treated by transition metal halide compound represented by formula $MX_4$, where M is group IV transition metal, especially Ti or Zr, and X is Cl or Br, under the hydrocarbon solvent such as heptane, decane, benzene and toluene to form magnesium supported transition metal catalyst component [a] as described in Equation (1). The molar ratio of transition metal halide compound to magnesium compound(M/Mg) can be between 0.3~1.0 and the preferred is 0.5~0.7.

The useful transition metal halides are tetravalent titanium or zirconium compounds such as $TiCl_4$, $ZrCl_4$, $TiBr_4$, $ZrBr_4$ and $TiCl_4$. The specific feature of the present invention is that the reacting molar ratio of (M/Mg) is higher than any other techniques and the resulting catalyst particle also has higher molar ratio (M/Mg) which is between 0.5 and 0.7, than any other techniques. When molar ratio of (M/Mg) of resulting catalyst particle is lower than 0.5 or higher than 0.7, copolymerization properties such as activity, hexane insoluble portion and even morphology of resulting polymer are deteriorated. The reaction of magnesium compound containing chelate ligand (A-1) with metal halide compound is carried out at high enough temperature, such as 70°~100° C., to substitute magnesium metal bonding to chelate ligand with transition metal and results in transition metal bonding to chelate ligand with formation of magnesium halide support simultaneously (second step of Equation 1). Through decanting and washing with hydrocarbon solvent, pure catalyst component (a) can be obtained.

In the preparation of transition metal catalyst component (a) by the Method (II), chelated transition metal compound (M-1) can be simply and easily obtained in the normal organometallic reaction condition (first step of Equation 2). Compared with the complicated synthesis of metallocene compound, the synthesis of chelated transition metal compound is carried out in the easier manner. For example, the reaction of the bidentate hydroxy or amine ligand compound such as 2,3-dihydroxynaphthalene or catechol with transition metal halide compound such as titanium halide in the chlorinated solvent such as $CH_2Cl_2$, $CHCl_3$ or $CCl_4$ smoothly produces chelated transition metal compound at room temperature reaction. The resulting chelate transition metal compound can be easily characterized by NMR, IR, elemental analysis, or X-ray crystallographic diffraction. Bubbling of nitrogen gas through the reaction solution increases the yield of the product. After separation of the chelated transition metal compound through decanting and washing with hydrocarbon solvent, the chelated transition metal compound (M-1) can be purified through recrystallization procedure. Then, the synthesized chelate compound is reacted with magnesium halide support compound, which is already prepared through the known method, to prepare the catalyst component (a) (second step of Equation 2).

Magnesium halide support can be readily obtained by the known method. For example, the reaction of magnesium halide solution in the mixed solvent of alcohol and hydrocarbon with organic aluminum compound produces a good solid support of magnesium halide support compound. Also, the reaction of Grignard reagent with alkyl halide compound in the etheral solvent gives a good particle of magnesium halide support compound. To modify the properties of the resulting catalyst, electron donor compound can be employed. Then, the solid magnesium halide support compound is reacted with chelated transition metal compound (M-1) at elevated temperature such as 70°~100° C. The reacting molar ratio of transition metal to magnesium metal, for example the ratio of (M/Mg), can be 0.3~1.0 and is preferred to be between 0.5 and 0.7. As like the preparation of catalyst component (a) by the Method (I), when molar ratio of (M/Mg) is lower than 0.5 or higher than 0.7, the (co)polymerization properties such as activity, the hexane insoluble amount, and morphology of the resulting polymer become worse. After the reaction for 1~2 hours, the resulting particles can be purified through decanting and washing procedure.

In the present invention, olefin polymerization can be done employing transition metal catalyst component (a) described above with organoaluminum compound component (b) represented by formula $R'nAlCl_{3-n}$ (R'=aliphatic hydrocarbon, n=2 or 3), as cocatalyst. It is one of the advantage of the present invention that olefin polymerization can be carried out without using methylaluminoxane (MAO) as cocatalyst. In the present invention, ethylene can be copolymerized with an alpha-olefin having 3 to 10 carbon atoms, preferably 4 to 8 carbon atoms, in the presence of chelated transition metal component (a) and the organoaluminum compound component (b). The useful organoaluminum compounds are triethylaluminum, triisobutylaluminum, trioctylaluminum, diethylaluminumchloride, diethylaluminumsesquichloride and preferred are triethylaluminum and diethylaluminumchloride. Examples of the alpha-olefin having 4 to 8 carbon atoms includes 1-butene, 1-pentene, 1-hexene, and 4-methyl-1-pentene. In the polymerization process of the present invention, the copolymerization of ethylene with alpha-olefin can be carried out in the liquid or gas phase in the presence of or absence of inert polymerization solvents such as hexane, octane, and cyclohexane. In the present invention, propylene can be polymerized in the presence of chelated transition metal component (a) and the organoaluminum compound component(b). The amount of the chelated transition metal catalyst component(a) can be varied and per liter of the polymerization reaction zone, the chelated transition metal component (a) is used in an amount of preferably about 0.001 to about 0.5 millimoles, calculated as transition metal atom; and the organoaluminum compound component (b) is used in such an amount that the aluminum/transition metal atomic ratio is from about 5 to about 100. The polymerization temperature may be about 40° C. to about 100° C. and (co)polymerization may be performed in the presence of hydrogen to control the molecular weight of (co)polymer. In the present invention, the ethylene copolymer having a density of 0.910 to 0.945 g/cm³ can be produced without causing any troubles such as the formation of substantial amount of ethylene copolymers soluble in hydrocarbon solvents and consequently the increase of viscosity of the copolymer solution causing reduction in stirring efficiency, blockage of pipes, and low efficiency of separating the copolymer from the reaction solvent, which is excellent.

EXAMPLES 1~6

Preparation of the chelated titanium catalyst component (a)

10.5g of tetrabromocatechol was dissolved in 200 ml of the mixed solvents of THF and heptane, where equal amounts of each solvent were mixed. After lowering temperature to 0° C. by ice, 25 ml of 2M BuMgCl solution in ether was added by dropwise manner over 30 min. and stirred for 1 hour at that temperature. After the reaction was complete, the resulting solid was separated to get white solid through decanting and washing with 500 ml of hexane. Then 25 ml of 0.91M ethylsesquichloride was added to the white solid with 500 ml of heptane and stirred for 1 hour at 70° C. White solid was separated again through filtering and washing with 500 ml hexane. Then, 500 ml of toluene was added to white solid and 5 ml of $TiCl_4$ was added subsequently to stir for 2 hours at 110° C. After the reaction was complete, brown solid was separated and purified by washing with 1,000 ml hexane. The titanium content in the solid catalyst was 9.95% and magnesium content was 8.11%.

Ethylene Polymerization

A 2-liter capacity autoclave thoroughly purged with nitrogen and charged with 1,000 ml of purified hexane, and purged with ethylene at room temperature. The temperature was raised and at 60° C. to 65° C., 3millimoles of triethylaluminum in hexane solution and subsequently 0.03 millimoles, calculated as titanium atom, of the solid titanium catalyst component were added. The autoclave was sealed and pressurized with hydrogen until the total volume of hydrogen input was 500 ml. Then the total pressure was raised to 6 kg/cm²-G with ethylene and the polymerization was carried out at 70° C. for 1 hour. After the polymerization, the polymer suspension was taken out when the inside temperature was lowered to 23° C., and filtered on a filter to separate it into a polymer powder and a hexane soluble portion. The hexane soluble portion was concentrated and the amount of the hexane soluble portion formed was measured. The results of the polymerization are shown in Table 1.

Ethylene/1-hexene copolymerization

A 2-liter capacity autoclave thoroughly purged with nitrogen and charged with 1,000 ml of purified hexane, and purged with ethylene at room temperature. The temperature was raised and at 60° C. to 65° C., 3 millimoles of triethylaluminum in hexane solution and subsequently 0.03 millimoles, calculated as titanium atom, of the solid titanium catalyst component were added. The amount of 1-hexene listed in Table 1 was added and the autoclave was sealed and pressurised with hydrogen until the total volume of hydrogen input was 500 ml. Then the total pressure was raised to 6 kg/cm$^2$·G with ethylene and the polymerization was carried out at 70° C. for 1 hour. After the polymerization, the polymer suspension was taken out when the inside temperature was lowered to 23° C., and filtered on a filter to separate it into a polymer powder and a hexane soluble portion. The hexane soluble portion was concentrated and the amount of the hexane soluble portion formed was measured. The results of the polymerization are shown in Table 1.

EXAMPLES 7~12

Preparation of chelated titanium catalyst component
(a)

2.75 g of catechol was dissolved in 200 ml of the mixed solvents of THF and heptane, where the volumetric ratio of THF and heptane was 0.2:1. After lowering temperature to 0° C. by ice, 25 ml of 2M BuMgCl solution in ether was added by dropwise manner over 30 min. and stirred for 1 hour at that temperature. After the reaction was complete, the resulting solid was separated to get white solid through decanting and washing with 500 ml of hexane. Then 25 ml of 0.91M ethylsesquichloride was added to the white solid with 500 ml of heptane and stirred for 1 hour at 70° C. White solid was separated again through filtering and washing with 500 ml hexane. Then, 500 ml of toluene was added to white solid and 5 ml TiCl$_4$ was added subsequently to stir for 2 hours at 110° C. After the reaction was complete, brown solid was separated and purified by washing with 1,000 ml hexane. The titanium content in the solid catalyst was 7.95%.

Ethylene polymerization and ethylene/1-hexene copolymerization

The polymerization was carried out in the same way as in Examples 1~6. The results are shown in Table 2.

EXAMPLES 13~18

Preparation of the chelated titanium catalyst component (a)

6.6 g of tetrachlorocatecholmonohydrate was dissolved in 10 ml THF and diluted by heptane to 200 ml. After lowering temperature to 0° C. by ice. 25 ml of 2M BuMgCl solution in ether was added by dropwise manner over 30 min. and stirred for 1 hour at that temperature. Then temperature was raised to 23° C. and stirred for 1 hour at that temperature to get transparent solution. 5 ml TiCl$_4$ was added subsequently by dropwise method and stirred for 2 hour at 110° C. After the reaction was complete, brown solid was separated and purified by washing with 1,000 ml hexane. The titanium content in the solid catalyst was 7.9%.

Ethylene polymerization and ethylene/1-hexene copolymerization

The polymerization was carried out in the same way as in Examples 1~6. The results are shown in Table 3.

EXAMPLES 19~24

Preparation of chelated transition metal compound
(M-1)

All the solvents used in this experiment were dried by proper method. 10.6 g of tetrabromocatechol was dissolved in 200 ml CH$_2$Cl$_2$ and 25 ml of TiCl$_4$ was added slowly by dropwise method and stirred for 1 hour at room temperature to get brown solution. The brown solid was precipitated by adding 500 ml hexane and separated from the solution by filtration. And the solid was washed with 800 ml hexane and recrystalized by the CH$_2$Cl$_2$ and hexane solvents. Brown crystalline solid was separated and dried by vacuum pumping to get the chelated titanium compound. Br$_4$C$_6$(O)$_2$TiCl$_2$ and elemental analysis result was C:13.11%, H:0.05%, Ti:8.73%, which is consistent with calculated data.

The mixture of anhydrous magnesium chloride(4.8 g), 23.1ml of 2-ethylhexanol, and 200 ml of decane were reacted at 140° C. for 3 hours to get transparent solution and 50 ml of 1M Et$_3$Al solution in hexane was added slowly. Temperature was raised to 70° C. with stirring and 50 ml of 1M Et$_2$AlCl solution in hexane was added slowly by dropwise method over 1 hour at 70° C. The solution was stirred at that temperature for 1 hour and white solid was separated from the solution by decanting and washing with hexane. Then 100 ml of toluene was added to the separated solid support material and the 100 ml of toluene solution of chelated titanium compound which was made by dissolving 1.5 g of Br$_4$C$_6$(O)$_6$TiCl$_2$ compound made above in 100 ml toluene. The mixture was stirred at 110° C. for 2 hours and the solid was separated by decanting and washing with toluene and hexane. The titanium content in the solid catalyst was 2.5%.

Ethylene polymerization and ethylene/1-hexene copolymerization

The polymerization was carried out in the same way as Examples 1~6. The results are shown in Table 4.

COMPARATIVE EXAMPLES 1~6

Preparation of the chelated titanium catalyst component (a)

4.76 g of anhydrous magnesium chloride, 31 ml of 2-ethylhexanol and 200 ml of decane were reacted at 140° C. for 2 hours to get transparent solution. Temperature was lowered to room temperature and 33 ml of TiC$_4$ was added slowly by dropwise method over 1 hour. Then temperature was raised to 80° C. over 1 hour and stirred for 1 hour at that temperature. Solid was precipitated and separated by decanting and washing with hexane. The titanium content in the solid catalyst was 4.7%.

Ethylene polymerization and ethylene/1-hexene copolymerization

The polymerization was carried out in the same way as in Examples 1~6. The results are shown in Table 5.

TABLE 1

| Exmpl | 1-hexene (mol) | polymerization activity (g-PE/g-cat · hr) | MFR (dg/min) | Density (g/ml) | Bulk density |
|---|---|---|---|---|---|
| 1 | 0 | 8,000 | 0.210 | 0.9612 | 0.35 |
| 2 | 10 | 12,000 | 0.301 | 0.9498 | 0.30 |

TABLE 1-continued

| Exmpl | 1-hexene (mol) | polymerization activity (g-PE/g-cat · hr) | MFR (dg/min) | Density (g/ml) | Bulk density |
|---|---|---|---|---|---|
| 3 | 20 | 13,000 | 0.335 | 0.9471 | 0.28 |
| 4 | 30 | 7,900 | 0.105 | 0.9363 | 0.30 |
| 5 | 40 | 7,000 | 0.366 | 0.9306 | 0.31 |
| 6 | 50 | 6,000 | 0.389 | 0.9251 | 0.28 |

TABLE 2

| Exmpl | 1-hexene (mol) | polymerization activity (g-PE/g-cat · hr) | MFR (dg/min) | Density (g/ml) | Bulk density |
|---|---|---|---|---|---|
| 7 | 0 | 6,500 | 0.179 | 0.9605 | 0.26 |
| 8 | 10 | 8,500 | 0.165 | 0.9502 | 0.25 |
| 9 | 20 | 9,500 | 0.155 | 0.9464 | 0.25 |
| 10 | 30 | 7,000 | 0.142 | 0.9395 | 0.24 |
| 11 | 40 | 6,000 | 0.176 | 0.9364 | 0.26 |
| 12 | 50 | 4,200 | 0.166 | 0.9301 | 0.26 |

TABLE 3

| Exmpl | 1-hexene (mol) | polymerization activity (g-PE/g-cat · hr) | MFR (dg/min) | Density (g/ml) | Bulk density |
|---|---|---|---|---|---|
| 13 | 0 | 9,000 | 0.205 | 0.9618 | 0.25 |
| 14 | 10 | 10,000 | 0.225 | 0.9547 | 0.27 |
| 15 | 20 | 11,000 | 0.194 | 0.94989 | 0.24 |
| 16 | 30 | 9,500 | 0.189 | 0.9405 | 0.27 |
| 17 | 40 | 7,500 | 0.209 | 0.9356 | 0.25 |
| 18 | 50 | 6,000 | 0.195 | 0.9275 | 0.25 |

TABLE 4

| Exmpl | 1-hexene (mol) | polymerization activity (g-PE/g-cat · hr) | MFR (dg/min) | Density (g/ml) | Bulk density |
|---|---|---|---|---|---|
| 19 | 0 | 10,000 | 0.115 | 0.9604 | 0.35 |
| 20 | 10 | 11,000 | 0.116 | 0.9462 | 0.36 |
| 21 | 20 | 12,900 | 0.119 | 0.9407 | 0.33 |
| 22 | 30 | 13,000 | 0.194 | 0.9401 | 0.30 |
| 23 | 40 | 10,000 | 0.082 | 0.9357 | 0.31 |
| 24 | 50 | 8,000 | 0.058 | 0.9293 | 0.34 |

TABLE 5

| Comp. Exmpl | 1-hexene (mol) | polymerization activity (g-PE/g-cat · hr) | MFR (dg/min) | Density (g/ml) | Bulk density |
|---|---|---|---|---|---|
| 1 | 0 | 6,000 | 0.101 | 0.9563 | 0.27 |
| 2 | 10 | 6,900 | 0.151 | 0.9509 | 0.28 |
| 3 | 20 | 7,500 | 0.178 | 0.9468 | 0.25 |
| 4 | 30 | 6,000 | 0.221 | 0.9432 | 0.26 |
| 5 | 40 | 5,500 | 0.255 | 0.9422 | 0.28 |
| 6 | 50 | 4,500 | 0.326 | 0.9411 | 0.29 |

What is claimed is:

1. A catalyst for olefin (co)polymerization, comprising:

(a) a solid catalyst component employing chelated transition metal compound supported on inorganic magnesium compound, wherein the chelated transition metal compound is represented by Formula (I),

Formula (I)

Wherein, M is group IV transition metal; X is halide; A and B independently contain an element O, S, Se, N, P, or Si that form chelate bond with transition metal M; R is aliphatic or aromatic hydrocarbon to form five membered ring with element A, B, and transition metal M;

(b) organoaluminum compound represented by R'nAlCl$_3$-n where R' is aliphatic hydrocarbon and n is 2 or 3, and which does not employ methylaluminoxane (MAO).

2. The catalyst according to claim 1, wherein the solid catalyst component (a) is the one produced by reacting a chelate ligand with Grignard reagent to form a magnesium compound containing chelate ligand, and reacting the magnesium compound containing chelate ligand with transition metal halide compound to form a chelated transition metal compound supported on magnesium halide compound.

3. The catalyst according to claim 1, wherein the solid catalyst component (a) is the one produced by reacting a chelate ligand with a transition metal halide compound to form a chelated transition metal compound, and reacting the chelated transition metal compound with magnesium halide compound to form a chelated transition metal compound supported on the magnesium halide compound.

4. The catalyst according to claim 2, wherein the chelate ligand is tetrabromocatechol, catechol, tetrachlorocatechol 4-tert-butylcatechol, 2,3-dihydroxynaphthalene, 2,3-dihydroxypyridine, or 8-hydroxyquinoline.

5. The catalyst according to claim 1, wherein R forms a rigid backbone and contains double bond or aromatic group.

6. The catalyst according to claim 1, wherein a molar ratio of M/Mg in the solid catalyst component (a) is from 0.3 to 1.0.

7. A process for the (co)polymerization of olefins, wherein the process is carried out in the presence of the catalyst of claim 1.

8. The catalyst according to claim 3, wherein the chelate ligand is tetrabromocatechol, catechol, tetrachlorocatechol 4-tert-butylcatechol, 2,3-dihydroxynaphthalene, 2,3-dihydroxypyridine, or 8-hydroxyquinoline.

* * * * *